United States Patent Office
3,124,543
Patented Mar. 10, 1964

3,124,543
METHOD OF STABILIZING CELLULAR POLY-
ETHERURETHANES WITH THIOUREA AND
DERIVATIVES THEREOF
George W. Fowler, South Charleston, and Fritz Hostettler
and William R. Proops, Charleston, W. Va., assignors
to Union Carbide Corporation, a corporation of New
York
No Drawing. Filed Apr. 26, 1960, Ser. No. 24,643
6 Claims. (Cl. 260—2.5)

This invention relates to polyurethane compositions, and more particularly to cellular foamed polyurethanes to which improved stability and resistance to heat deterioration have been imparted by the addition of thiourea and derivatives thereof.

Synthetic urethane products derived from reactions involving isocyanates with active hydrogen-containing compounds are rapidly becoming competitive with natural and synthetic rubbers. Urethane polymers formed by reactions of di- or poly-isocyanates with active hydrogen-containing compounds, e.g., polyols, polyesters, polyester-amides, polyamines, water, polyalkylene ether glycols, etc., are readily foamed by internal development of carbon dioxide or by means of a blowing agent which vaporizes at or below the temperature of the foaming mass. More recently, commercial interest has been directed to poly-ether-based urethane foams prepared by the one-shot and prepolymer techniques in which catalysis is effected by an organic tin compound. Organic tin catalysts offer a considerable number of advantages among which are controllable reaction rates and effective use in small concentrations. One of the more important disadvantages common to such catalysts, however, is their tendency to promote deterioration of polyether-based urethane foams at elevated temperatures. This is undesirable since the deterioration results in a corresponding loss of desired physical properties, e.g., tensile strength, compression set, elongation and load-bearing properties, which thus limits the utility of the foam for its intended purpose.

The present invention is predicated on the discovery that thiourea and derivatives thereof are highly effective as stabilizers for cellular polyurethane foams prepared from polyether-isocyanate reaction systems catalyzed by an organic tin catalyst. It has been found that when a minor amount of thiourea or derivative thereof is incorporated in a polyether-isocyanate reaction system of the above type and the mixture subsequently foamed by the one-shot, semiprepolymer or prepolymer technique, improved urethane foams are obtained which effectively resist deterioration at elevated temperatures and exhibit a significant retention of desired physical properties. Although the exact mechanism of stabilization is not known, it appears that the deterioration of polyether-based urethane foams at elevated temperatures is due to an oxidative degradation which results from an attack on polyether linkages by free radicals produced from the organic tin catalyst during the curing cycle of the foam. Thiourea and its derivatives are believed to prevent the cleavage or degradation of polyether linkages through their function as a chelating or sequestering agent for the free radicals.

The compounds utilized in accordance with the invention include thiourea and derivatives thereof corresponding to the general formula:

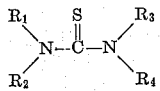

in which $R_1$, $R_2$, $R_3$ and $R_4$ represent members selected from the group of hydrogen and hydrocarbon radicals such as alkyl, aryl, alkaryl, aralkyl and cycloalkyl; and in which $R_1$ and $R_2$ or $R_3$ and $R_4$ taken together with a nitrogen atom can represent a phenylazo radical, $C_6H_5N:N-$, or heterocyclic ring structure, and in which either of $R_1$ and $R_2$ with $R_3$ or $R_4$ taken together with the nitrogen atoms can form a heterocyclic ring structure. The hydrocarbon radicals include benzyl, phenyl, tolyl, cyclopropyl, cyclobutyl, cyclopentyl, cyclohexyl, etc., as well as alkyl radicals of 1 to 18 carbon atoms such as methyl, ethyl, propyl, isopropyl, butyl, isobutyl, tertiary butyl, amyl, isopentyl, hexyl, heptyl, decyl, dodecyl, etc. One or more of the hydrocarbon radicals may be substituted, if desired, with halogen, nitro, lower alkyl, alkoxy, oxo, thio, or alkoxycarbonyl, etc., substituents.

Representative compounds included within the scope of the invention are thiourea, thiocarbanilide, phenylthiourea, ethylenethiourea, ethylidenethiourea, isopropylidenethiourea, benzylidenethiourea, thiobarbituric acid, diphenylthiocarbazone and dithiobiuret.

In carrying out the invention thiourea and its derivatives may be added to the liquid polyether, the isocyanate, or the polyether-isocyanate reaction mixture. The mixture is then simultaneously or stepwise foamed in the presence of the organo-tin catalyst by internal development of carbon dioxide, or by means of a blowing agent which vaporizes at or below the temperature of the foaming mass.

The amount of thiourea or derivative employed will vary with such considerations as concentration, type of tin catalyst used and polyether reactant. As a general guide, thiourea and its derivatives are used in amounts ranging from about 0.001 to 5%, preferably about 0.01 to 1.0%, by weight, based on the total weight of the polyether-isocyanate reaction mixture.

Thiourea and its derivaitves are effective stabilizers for a wide variety of polyurethane foams derived from the reaction of polyethers and isocyanates. The term "polyether" as used herein refers to a compound which has a molecular weight of at least about 250, a plurality of ether oxygens, and contains at least two active hydrogens as measured and determined by the Zerewitinoff method, J.A.C.S., vol. 49, p. 3181 (1927).

Illustrative polyethers include polyoxyalkylene glycols such as the polyoxyethylene glycols prepared by the addition of ethylene oxide to water, ethylene glycol or diethylene glycol; polyoxypropylene glycols prepared by the addition of 1,2-propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and 1,2-propylene oxide; polyether glycols prepared by reacting ethylene glycol, propylene oxide or mixtures thereof with mono- and polynuclear dihydroxy benzenes, e.g., catechol, resorcinol, hydroquinone, orcinol, 2,2-bis(p-hydroxyphenyl)propane, bis(p-hydroxyphenyl)methane, and the like; polyethers prepared by reacting ethylene oxide, propylene oxide or mixtures thereof with aliphatic polyols such as glycerol, sorbitol, trimethylolpropane, 1,2,6-hexanetriol, pentaerythritol, sucrose or glycosides, e.g., methyl, ethyl, propyl, butyl and 2-ethylhexyl arabinoside, xyloside, fructoside, glucoside, rhammoside, etc.; polyethers prepared by reacting ethylene oxide, propylene oxide or mixtures thereof with alicyclic polyols such as tetramethylolcyclohexanol; polyols containing a heterocyclic nucleus such as 3,3,5-tris(hydroxymethyl)-5-methyl-4-hydroxytetrahydropyran and 3,3,5,5-tetrakis(hydroxymethyl)-4-hydroxytetrahydropyran; or polyols containing an aromatic nucleus such as 2,2-bis(hydroxyphenyl)ethanol, pyrogallol, phloroglucinol, tris(hydroxyphenyl)alkanes, e.g., 1,1,3-tris(hydroxyphenyl)ethanes, and 1,1,3-tris(hydroxyphenyl)propanes, etc., tetrakis(hydroxyphenyl)alkanes, e.g., 1,1,3,3-tetrakis(hydroxy - 3 - methylphenyl)-propanes, 1,1,5,5 - tetrakis(hydroxyphenyl)butanes, and the like.

Other suitable polyols include the ethylene oxide, propylene oxide and mixed oxide adducts of aliphatic polyamines such as ethylene diamine, triethylene diamine, etc.; aromatic polyamines such as o-, m-, and p-phenyl-enediamine; 2,4- and 2,6-diaminotoluene; 2,6-diamino-p-xylene; 4,6-diamino-m-xylene; 2,4-diamino-m-xylene; 3,5-diamino-o-xylene; 2,6-diaminopyridine; 1,4-naphthylene-diamine; benzidine; tolidine; 4,4' - methylenedianiline; 4,4',4''-methylidynetrianiline, and the like.

The molecular weight of the polyether used should range from about 250 to about 12,000 depending upon the characteristics desired in the foamed urethane product. As a general rule, cellular urethane foams of maximum rigidity are prepared by the use of polyethers having a molecular weight range of about 250 to 1250; for semirigid foams the molecular weight of the polyether should be about 800 to 1800; and for flexible open-cell foams the polyether should be of increased chain length and have a molecular weight of about 1800 to 12,000.

A variety of isocyanates may be employed for reaction with the polyethers above described to provide urethane foams which can be stabilized according to the invention. Preferred isocyanates are polyisocyanates and polyisothiocyanates of the general formula:

$$R(NCG)_x$$

wherein G is oxygen or sulfur, $x$ is an integer of two or more and R is an alkylene, subsituted alkylene, arylene or substituted arylene radical, a hydrocarbon, or substituted hydrocarbon containing one or more aryl —NCG bonds and one or more alkyl —NCG bond. R can also include radicals such as —RZR— where Z may be a divalent moiety such as —O—, —O—R—O—, —CO—, —CO$_2$—, —S—, —S—R—S—, —SO$_2$—, etc. Examples of such compounds include hexamethylene diisocyanate, 1,8-diisocyanato-p-menthane, xylene diisocyanates, $$(OCNCH_2CH_2CH_2OCH_2)_2$$

1-methyl-2,4-diisocyanatocyclohexane, phenylene diisocyanates, tolylene diisocyanates, chlorophenylene diisocyanates, diphenylmethane - 4,4' - diisocyanate, naphthalene-1,5 - diisocyanate, triphenylmethane-4,4',4''-triisocyanate, xylene-α,α' - diisothiocyanate, and isopropylbenzene-α,4-diisocyanate.

Further included are dimers and trimers of isocyanates and diisocyanates and polymeric diisocyanates of the general formulae:

$$(RNCG)_x \text{ and } [R(NCG)_x]_y$$

in which $x$ and $y$ are two or more, as well as compounds of the general formula:

$$M(NCG)_x$$

in which $x$ is one or more and M is a monofunctional or polyfunctional atom or group. Examples of this type include ethylphosphonic diisocyanate, $C_2H_5P(O)(NCO)_2$; phenylphosphonic diisocyanate, $C_6H_5P(NCO)_2$; compounds containing a ≡Si—NCG group, isocyanates derived from sulfonamides ($RSO_2NCO$), cyanic acid, thiocyanic acid, and compounds containing a metal-NCG group such as tributyltin isocyanate.

The preparation of polyether-based urethane foams can be carried out by forming a prepolymer, i.e., prereacting molar equivalents of the polyether and isocyanate in the absence of water and thereafter producing a foam by the addition of excess isocyanate, tin catalyst, water and surfactant; by the one-shot method in which the polyether, blowing agent, and isocyanate reactants are simultaneously mixed together and allowed to react in the presence of an organic tin catalyst; or by the semi-prepolymer technique wherein the polyether reactant is partially extended with excess isocyanate to provide a reaction product containing a high percentage of free isocyanate groups (20–35%) which is then foamed at a later stage by reaction with additional polyether, a blowing agent and tin catalyst.

The amount of isocyanate used in the preparation of flexible, rigid or semirigid foams should be such that there is more than the theoretical amount required to form a urethane linkage, —NHCO—O—, in the polymer resulting from reaction of the isocyanate with the active hydrogens of the polyether. The amount of isocyanate employed generally ranges from about 1.0 to 7 equivalents, preferably 2 to 6 equivalents, per equivalent of polyether.

The reaction of excess diisocyanate with a polyoxypropylene glycol produces a polymer having terminal isocyanate groups as illustrated by the equation:

(I) excess OCN—R—NCO+HO($C_2H_4O$)$_n$H→OCN—R [NH—CO—O—($C_2H_4O$)$_n$—$C_2H_4$—O—CONHR]$_x$NCO in which R represents an aliphatic, cycloaliphatic or aromatic diisocyanate exclusive of reactive isocyanate groups (—NCO), $x$ is an integer greater than 1 and $n$ is an integer such that the molecular weight of the ether glycol is at least 250. When it is desired to form a foam, the mixture of the isocyanate-modified polyether reacts through the isocyanate groups with a chain extending agent containing active hydrogen, e.g., water, in the presence of an organic tin catalyst. This involves several reactions that proceed simultaneously including the reaction between the isocyanate groups and water to form urylene links (—NHCONH—) and carbon dioxide, as well as the reaction of the urylene links so formed with unreacted isocyanate groups to form biuret cross links. Depending upon the desired density of the urethane foam and the amount of cross linking desired, the total —NCO equivalent to total active hydrogen equivalent should be such as to provide a ratio of 0.8 to 1.2 equivalents of —NCO per equivalent of active hydrogen and preferably a ratio of about 0.9 to 1.1 equivalents.

The foaming operation also can be effected by means of a blowing agent, such as a low boiling, high molecular weight gas, which vaporizes at or below the temperature of the foaming mass. In rigid foams intended for use in the field of insulation and structural reinforcement the incorporation of a gas lowers its heat conductivity. If a fluorocarbon gas such as trichloromonofluoromethane, "Ucon 11," is used in blowing rigid foams, a lower K— factor is obtained than in rigid foams of equal density blown with air or carbon dioxide. The reactions that occur during this type operation include formation of the urethane linkage as well as the formation of isocyanate dimers and trimers. In addition, another reaction that can occur is the formation of allophanate structures.

Preferred blowing agents are the fluorocarbons such as trichloromonofluoromethane; dichlorodifluoromethane, dichlorofluoromethane, 1,1 - dichloro - 1-fluoroethane; 1-chloro-1,1-difluoro,2,2-dichloroethane; and 1,1,1-trifluoro, 2-chloro-2-fluoro, 3,3-difluoro, 4,4,4-trifluorobutane. The amount of blowing agent used will vary with density desired in the foamed product. In general it may be stated that for 100 grams of resin mix containing an average NCO/OH ratio of 1 to 1, about 0.005 to 0.3 mole of gas are used to provide densities ranging from 30 to 1 lbs. per cubic foot. If desired, water may be used in conjunction with the blowing agent.

Organic tin catalysts that are suitable for accelerating the polyether-isocyanate reaction are compounds having the general formula:

(a) $R_3SnX$ or $R_4Sn$
(b) $R_2SnX_2$
(c) $RSnX_3$
(d) $R_2SnY$
(e) $RSnOOR'$
(f) $R(SnOOR')_2$ (g) 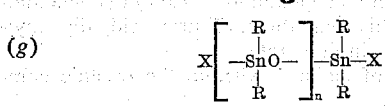

(h)    $R_2Sn(YRX)_2$ in which R represents hydrocarbon or substituted hydrocarbon radicals such as alkyl, aralkyl, aryl, alkaryl, alkoxy, cycloalkyl, alkenyl, cycloalkenyl, and analogous substituted hydrocarbon radicals; the R' represents hydrocarbon or substituted hydrocarbon radicals such as those designated by the R or hydrogen or metal ions, the X represents hydrogen, halogen, hydroxyl, amino, alkoxy, substituted alkoxy, acyloxy, substituted acyloxy, acyl radicals or organic residues connected to tin through a sulfide link; and the Y represents chalcogens including oxygen and sulfur.

Among the compounds of group (a) that deserve special mention are trimethyltin hydroxide, tributyltin hydroxide, trimethyltin chloride, trimethyltin bromide, tributyltin chloride, trioctyltin chloride, triphenyltin chloride, tributyltin hydride, triphenyltin hydride, triallyltin chlorde, tributyltin fluoride, tributyltin acetate, and tetrabutyltin, etc.

The compounds in group (b) that deserve particular mention and are representative of the group include dimethyltin diacetate, diethyltin diacetate, dibutyltin diacetate, dioctyltin diacetate, dilauryltin diacetate, dibutyltin dilaurate, dibutyltin maleate, dimethyltin dichloride, dibutyltin dichloride, dioctyltin dichloride, diphenyltin dichloride, diallyltin dibromide, diallyltin diiodide, bis(carboethoxymethyl)-tin diiodide, dibutyltin dimethoxide, dibutyltin dibutoxide, $(C_4H_9)_2Sn[OCH_2—(CH_2OCH_2)_{x-1}CH_2OCH_3]_2$ (in which x is a positive integer), dibutyl-bis[O-acetylacetonyl]=tin, dibutyltin-bis(thiododecoxide), and

all readily prepared by hydrolysis of the corresponding dihalides. Many commercially available compounds used as stabilizers for vinyl resins are also included in this group.

Among the compounds that are representative of group (c) are butyltin trichloride, octyltin trichloride, butyltin triacetate and octyltin tris(thiobutoxide).

Typical among the compounds of group (d) are dimethyltin oxide, diethyltin oxide, dibutyltin oxide, dioctyltin oxide, dilauryltin oxide, diallyltin oxide, diphenyltin oxide, dibutyltin sulfide, $[HOOC(CH_2)_5]_2SnO$, $[CH_3OCH_2(CH_2OCH_2)_{x-1}CH_2]_2SnO$ and $[CH_3OCH_2(CH_2OCH_2)_{x-1}CHO(CH_2)_5]_2SnO$ (in which the x's are positive integers).

Methylstannonic acid, ethylstannonic acid, butylstannonic acid, octylstannonic acid, $HOOC(CH_2)_5—SnOOH$, $(CH_3)_3N(CH_2)_5SnOOH$, $CH_3OCH_2(CH_2OCH_2)_{x-1}CH_3SnOOH$ and $CH_3OCH_2(OH_2OCH_2)_x\_CH_2O—(CH_2)_5SnOOH$ are examples of group (e) catalysts and group (f) catalysts are represented by $HOOSn(CH_2)_xSnOOH$ and $HOOSnCH_2—(CH_2OCH_2)_xCH_2SnOOH$, the x's being positive integers.

Typical compounds in group (g) include compounds as poly(dialkyltin oxides) such as dibutyltin basic laurate and dibutyltin basic hexoxide.

Other compounds that are efficient catalysts are those of group (h) which include the organo-tin compounds used as heat and light stabilizers for chlorinated polymers.

Other organic tin compounds which can be used include the divalent tin compounds selected from the group consisting of stannous acylates and stannous alkoxides.

Suitable stannous acylates are the divalent tin salts of aliphatic mono- and polycarboxylic acids which contain from 1 to 54 carbon atoms. The acids can be saturated, such as acetic acid, 2-ethylhexanoic acid, etc.; unsaturated such as oleic acid, linoleic acid, ricinoleic acid, and the like; or they may be polymerized fatty acids derived from natural oils, e.g., linseed oil, tung oil, soybean oil, dehydrated castor oil, which have a molecular weight up to about 500. Examples of specific acylates include: stannous acetate, stannous propionate, stannous oxalate, stannous tartrate, stannous butyrate, stannous valerate, stannous caproate, stannous caprylate, stannous octoate, stannous laurate, stannous palmitate, stannous stearate, and stannous oleate. Of these materials the preferred catalysts are stannous acetate, stannous octoate and stannous oleate.

The stannous alkoxides which can be used may be represented by the formula:

$$Sn(OR)_2$$

in which R is a monovalent hydrocarbon radical, saturated or unsaturated, branched chain or straight chain, containing 1 to 18 carbon atoms, preferably 3 to 12. Representative examples of stannous alkoxides include stannous methoxide, stannous isopropoxide, stannous butoxide, stannous t-butoxide, stannous 2-ethylhexoxide, stannous tridecanoxide, stannous heptadecanoxide, stannous phenoxide, and o, m and p-stannous cresoxides, etc.

Either class of stannous catalysts may be substituted with hydroxy, halo and keto, etc., groups.

The following examples illustrate the best mode now contemplated for carrying out the invention.

EXAMPLES 1 TO 7

A standard polyurethane formulation containing the following materials was prepared as follows:

| Material— | Percent |
|---|---|
| Polyoxypropylene glycol, 2,000 molecular weight | 70.5 or 70.9. |
| Water | 1.88. |
| Dibutyltin dilaurate | 0.47. |
| Emulsifier (siloxane-oxyalkylene copolymer) | 0.59. |
| Triethylenediamine | 0.094. |
| Tolylenediisocyanate | 26.0. |
| Additive | 1.0 to 0.1. |

Polyurethane foams were prepared by mixing all of the above ingredients except tolylenediisocyanate with gentle stirring until a clear solution resulted. Air was then beaten into the mixture for about 5 seconds and the isocyanate added with vigorous agitation. When the mixture began to foam, it was poured into a wax-coated paper bag 6 inches long and 8 inches wide. After the foam reached maximum height it was oven cured at 130° C. and the paper sides then removed. Thereafter the foamed polyurethane was placed in a forced air oven at 130° C. for the time specified. Tensile values in some instances were rated as either strong or weak. A weak foam would have a tensile value of about 1–5 p.s.i. while a strong one would have a tensile value of about 5–15 p.s.i. A control foam containing no inhibitor would have no tensile strength after 1½ hours and be called extremely weak. Table I illustrates the effectiveness of thiourea and derivatives thereof for imparting stability and resistance to heat deterioration in foamed polyurethane products.

Table I

| Example | | Concentration, Wt. percent | Tensile Strength, p.s.i., After Heating for 1.5 Hrs. |
|---|---|---|---|
| 1 | Thiocarbanilide | 1.0 | Strong. |
| 2 | Thiourea | 1.0 | Strong. |
| 3 | Phenylthiourea | 1.0 | Strong. |
| 4 | Ethylenethiourea | 0.1 | Weak. |
| 5 | 2-Thiobarbituric acid | 0.1 | Weak. |
| 6 | Diphenylthiocarbazone | 0.5 | Weak. |

What is claimed is:

1. In the method for preparing polyurethanes wherein a polyether polyol having a molecular weight of at least 250 and containing at least two active hydrogens as measured and determined by the Zerewitinoff method is reacted with an organic polyisocyanate in admixture with an organic tin catalyst and a blowing agent to form a polyurethane foam, the improvement which comprises incorporating into the reaction mixture a minor amount of an organic compound of the group consisting of a thiourea compound of the formula

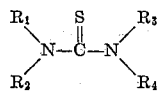

wherein $R_1$, $R_2$, $R_3$ and $R_4$ are of the group consisting of hydrogen, alkyl, aryl, alkaryl, aralkyl and cycloalkyl; and ethylenethiourea, ethylidenethiourea, isopropylidenethiourea, benzylidenethiourea, thiobarbituric acid, diphenylthiocarbazone and dithiobiuret.

2. The method of claim 1 wherein the organic compound is thiourea.
3. The method of claim 1 wherein the organic compound is thiocarbanilide.
4. The method of claim 1 wherein the organic compound is phenylthiourea.
5. The method of claim 1 wherein the organic compound is ethylenethiourea.
6. The method of claim 1 wherein the organic compound is 2-thiobarbituric acid.

References Cited in the file of this patent

UNITED STATES PATENTS

| 2,760,953 | Seeger | Aug. 28, 1956 |
| 2,764,565 | Hoppe et al. | Sept. 25, 1956 |
| 2,843,568 | Benning et al. | July 15, 1958 |
| 2,955,056 | Knox | Oct. 4, 1960 |
| 2,975,146 | Rogers et al. | Mar. 14, 1961 |

OTHER REFERENCES

Mobay Publication: "A One Shot System for Flexible Polyetherurethane Foams," Nov. 10, 1958, 4 pages.

Hackh's Chemical Dictionary, 3rd edition, page 599, McGraw-Hill Book Company, New York.

Saunders: Rubber Chemistry and Technology, volume 33, No. 5, December 1960, pages 1299–1302.